United States Patent Office 3,496,145
Patented Feb. 17, 1970

3,496,145
AMMONIUM ARSENATES, ORGANO-SUBSTITUTED ARSENATES, AND SODIUM, POTASSIUM AND CALCIUM ARSENITE AS FIRST STAGE CATALYTIC ADDITIVES IN DIRECT ESTERIFICATION PROCESS
Mary E. Carter, Philadelphia, and John A. Price, Swarthmore, Pa., assignors to FMC Corporation, Philadelphia, Pa., a corporation of Delaware
No Drawing. Filed June 26, 1967, Ser. No. 648,951
Int. Cl. C08g 17/06
U.S. Cl. 260—75                                10 Claims

ABSTRACT OF THE DISCLOSURE

Process of preparing polyethylene terephthalate resin comprising carrying out a direct esterification reaction between terephthalic acid and ethylene glycol in the presence of an arsenic compound, wherein the arsenic compound is selected from the group consisting of ammonium arsenate, diammonium arsenate, disodium methyl arsenate, sodium dimethyl arsenate, calcium arsenite, potassium hydrogen arsenite, sodium arsenite, and disodium arseno-acetate monohydrate.

---

This invention relates to a method of preparing highly polymeric linear polyesters. In particular, it relates to a novel method of preparing polyethylene terephthalate resin that has physical and chemical properties that make it particularly well suited for filament-forming purposes.

In general, the preparation of highly polymeric linear polyester resin from a dicarboxylic acid and a diol is well-known in the art. In the preparation of such polyesters, a dicarboxylic acid and diol are first combined and subjected to a direct esterification reaction. The resulting product or prepolymer is then polycondensed at higher temperatures and under reduced pressure in the presence of a polycondensation catalyst to form the desired polyester resin.

For commercial purposes, it is essential that the polyester resin be produced in the shortest possible time and that the desired degree of polymerization be obtained. Additionally, it is essential that the polyester resin be of such color so that filaments formed therefrom will appear substantially white in color. In particular, a polyethylene terephthalate resin suitable for melt spinning should have a carboxyl content value of about or below 50 equivalents per million grams (eq./10$^6$ gr. or meq./kg.), an intrinsic viscosity of preferably not less than 0.60 (as determined in a 60% phenol and 40% tetrachloroethane solution, wt./wt., at 30° C.), a melting point preferably not less than about 258–260° C., and be either pale white or off-white in color in order for the filaments formed therefrom to possess a satisfactory level of hydrolytic stability, thermal stability, ultra-violet light stability, color and have a high degree of tenacity.

It is an object of this invention to prepare a polyester resin by a direct esterification reaction between a diol and a dicarboxylic acid, followed by the polycondensation of the resulting esterified product.

Another object of the present invention is to provide a novel method for the preparation of polyethylene terephthalate resin having excellent properties and particularly suitable for melt extrusion into non-degraded processable filaments by a direct esterification and polycondensation reaction procedure.

Another object of the present invention is to provide an improved method for carrying out the direct esterification reaction between ethylene glycol and terephthalic acid in the preparation of polyethylene terephthalate.

These and other objects are accomplished in accordance with the present invention which involves a method of preparing polyethylene terephthalate wherein terephthalic acid and ethylene glycol are directly esterified and the product of esterification is polycondensed in the presence of a polycondensation catalyst, the improvement comprising out the said direct esterification reaction in the presence of a catalytic amount of an arsenic compound wherein the arsenic constituent thereof in its anionic form is neutralized properly by a basic cation constituent thereof.

In accordance with the present invention, it has been found that arsenates and arsenites having a basic cation constituent are particularly valuable as first stage additives or catalytic additives in the first stage or direct esterification reaction between terephthalic acid and ethylene glycol, in the preparation of polyethylene terephthalate. For example, among the first stage or catalytic additives that can be used in accordance with the present invention are ammonium arsenate, diammonium arsenate, calcium arsenate, lithium arsenate, sodium arsenate, disodium methyl arsenate, sodium dimethyl arsenate, calcium arsenite, potassium hydrogen arsenite, sodium arsenite, and disodium arseno-acetate monohydrate, or any combination thereof.

The subject arsenic compounds used as catalytic additives in the present invention are generally employed in the range of from about $5 \times 10^{-6}$ to about $5 \times 10^{-2}$ mole per mole of terephthalic acid in the subject terephthalic acid-ethylene glycol reaction mixture. Higher or lower concentrations of the present catalytic additives can also be used. However, when concentrations less than the above are used, their catalytic effort is generally reduced, whereas when concentrations greater than this are used, no further improvement in the desired product is generally obtained.

The preparation of polyesters of the present invention via the direct esterification reaction are generally carried out with a molar ratio of ethylene glycol to terephthalic acid of from about 1:1 to 15:1, but preferably from about 1.2:1 to 2.5:1. The first stage direct esterification reaction of the present method is generally carried out at temperatures ranging from about 220–290° C. in the absence of an oxygen-containing gas at atmospheric or elevated pressure for about 2 to 4 hours. For example, the reaction may be carried out in an atmosphere of nitrogen. When the direct esterification step is completed, as indicated, for example, by the formation of a clear reaction mixture, any remaining glycol is distilled off and a polycondensation catalyst is added to the reaction product. The second stage or polycondensation step of the present method is generally carried out under reduced pressure in the range of from about 0.05 to 20 mm. of mercury in the absence of an oxygen-containing gas at temperatures from about 260–325° C. for about 2 to 5 hours.

The polycondensation step of the present method is accomplished through the use of a conventional polycondensation catalyst, for example antimony trioxide. The polycondensation catalyst may, if indicated, be added to the present reaction mixture before initiating the direct esterification reaction between the diol and dicarboxylic acid or after the esterified reaction product thereof is formed. The polycondensation catalysts are employed in concentrations ranging from about 0.005 to about 0.5%, based on the total weight of the reactants.

In order to illustrate the excellent color of the resin which is obtained by using the method of the present invention, the reflectance of the resins produced in the following examples were measured by a "Color-Eye" (Model D-1), which is the trade name for a differential colorimeter manufactured by the Instrument Development Laboratories, Attleboro, Mass. The color values obtained are based on luminance (Y on the C.I.E. system), which is a measurement of the proportion of the incidence light reflected and therefore a measure of the whiteness or lightness of the polyester polymer being evaluated. The determination of Y on the C.I.E. system, as hereinafter set forth, was determined by using a molded plaque of the polyester resin product having the dimensions 1″ x 1″ x 1/16″. In general, it is considered that a polymer resin exhibiting a Y value of not less than about 40 out of a theoretical possible 100 under the present test conditions, is suitable for fiber forming purposes.

The following examples of several preferred embodiments will further serve to illustrate the present invention. All parts are by weight unless otherwise indicated.

EXAMPLES

A mixture of terephthalic acid and ethylene glycol at ratios and weights indicated in the following table, and $5 \times 10^{-5}$ mole of a first stage arsenic compound additive, as listed in the following table with exact weight used, was charged to a Fischer-Porter pressure assembly equipped with a nitrogen sparge tube and a distilling arm. The reactor was lowered into an oil bath maintained at 260° C. or 270° C. and flushed for ten minutes with dry nitrogen. All of the examples were initially carried out in a 260° C. oil bath, except Examples 3 and 4, which were carried out in a 270° C. oil bath. A nitrogen pressure of 60 p.s.i. was applied and a distillate of water-ethylene glycol was collected. When a clear reaction mixture, i.e. solution, was obtained, pressure was reduced to atmospheric and the remaining glycol was distilled. Then, the resulting low molecular weight prepolymer was further reacted (polycondensed) in the presence of 0.04%, based on the weight of the prepolymer, of antimony trioxide under a vacuum of about 0.1 mm. of mercury at 282° C. for periods of time indicated on the following table to form a polyester resin.

The following table sets forth conditions and results of various reactions carried out as described above.

turn, the polyester resin product. The present first stage additives act to reduce the direct esterification time and bring about the formation of a prepolymer which is, in general, characterized as being a more highly esterified product than one wherein no esterification additive is used, as indicated by the carboxyl content values of the prepolymers. In addition, the prepolymers of the present method can be condensed with convenional polycondensation catalysts to yield polyester resins which have high molecular weights, as indicated by their intrinsic viscosities, low carboxyl content values, suitably high melting points and exceptionally good color, so as to make the resins particularly suitable for filament-forming purposes.

The process of the present invention has been described with particular reference to polyethylene terephthalate. However, it will be obvious that the subject invention includes within its scope the preparation of other polymethylene terephthalates prepared from glycols of the series $HO(CH_2)_nOH$, where $n$ is 2 to 10 and terephthalic acid and copolyesters containing various amounts of other dicarboxylic acids, such as isophthalic acid.

We claim:

1. In a method of preparing polyethylene terephthalate resin wherein terephthalic acid and ethylene glycol are directly esterified and the product of esterification is polycondensed in the presence of a polycondensation catalyst, the improvement comprising carrying out the said direct esterification reaction in the presence of a catalytic amount of a direct esterification catalytic additive selected from the group consisting of ammonium arsenate, diammonium arsenate, disodium methyl arsenate, sodium dimethyl arsenate, calcium arsenite, potassium hydrogen arsenite, sodium arsenite, and disodium arseno-acetate monohydrate.

2. The method of claim 1 wherein the arsenic compound is present in an amount ranging from about $5 \times 10^{-6}$ to about $5 \times 10^{-2}$ mole per mole of terephthalic acid in the reaction mixture.

3. The process of claim 1 wherein the arsenic compound is ammonium arsenate.

4. The process of claim 1 wherein the arsenic compound is sodium dimethyl arsenate.

TABLE

| Example No. | First stage additive | Weight of first stage additive, gms. | Molar ratio [1] of ethylene glycol to terephthalic acid | Esterification time, hrs.:min | Prepolymer carboxyl content, meq./kg. | Polycondensation time, hours | Intrinsic viscosity | Polyester carboxyl content, meq./kg. | Melting Pt., °C. | Color Y C.I.E |
|---|---|---|---|---|---|---|---|---|---|---|
| 1 | None | | 2:1 | 3:41 | 316 | 2 4 | 0.36 | 32 | | |
| 2 | Ammonium arsenate $(NH_4)_3AsO_4$. | .0096 | 2:1 | 3:00 | 100 | 4 | 0.70 | 30 | 258 | 49.6 |
| 3 | Diammonium arsenate $(NH_3)_2HAsO_4$. | .0088 | 1.5:1 | 3:00 | 125 | 4 | 1.0 | 27 | 258 | 46.9 |
| 4 | Calcium arsenate $Ca_3(AsO_4)_2 \cdot 3H_2O$. | .0226 | 1.5:1 | 3:00 | 15 | 2.5 | 0.81 | 17 | | 41.9 |
| 5 | Lithium arsenate $Li_3AsO_4$ | .0080 | 2:1 | 3:15 | 200 | 4 | 0.91 | 30 | | 42.8 |
| 6 | Sodium arsenate $Na_3AsO_4$ | .0104 | 1.2:4 | 2:30 | 75 | 4 | 0.98 | 22 | 260 | 54.7 |
| 7 | Disodium methyl arsenate $Na_2CH_3AsO_3$. | .0092 | 2:1 | 3:00 | 85 | 4 | 0.75 | 34 | | 54.2 |
| 8 | Sodium dimethyl arsenate $Na(CH_3)_2AsO_2 \cdot 3H_2O$. | .0107 | 2:1 | 3:30 | 150 | 4 | 0.60 | 37 | | |
| 9 | Calcium arsenite $Ca_3(AsO_3)_2$ | .0183 | 2:1 | 3:30 | 150 | 2 | 0.89 | 28 | 261 | 45.5 |
| 10 | Potassium hydrogen arsenite $KH(AsO_2)_2$. | .0127 | 1.5:1 | 4:30 | 168 | 4 | 0.85 | 45 | 261 | 47.5 |
| 11 | Sodium arsenite $NaAsO_2$ | .0065 | 1.5:1 | 3:00 | 175 | 4 | 0.85 | 26 | | 42.2 |
| 12 | Disodium arseno-acetate monohydrate $(HO)(NaO)AsOCH_2CO_2Na \cdot H_2O$. | .0123 | 1.5:1 | 4:30 | 190 | 4 | 0.94 | 21 | 261 | 43.0 |

[1] In the above examples, where a 1.2:1 molar ratio of ethylene glycol to terephthalic acid is indicated, about 47 g. of ethylene glycol and 103 g. of terephthalic acid were present in the reaction mixture; where a 1.5:1 molar ratio is indicated, about 53.4 g. of ethylene glycol and 96.6 g. of terephthalic acid were present; where a 2:1 molar ratio is indicated, about 62 g. of ethylene glycol and 84 g. of terephthalic acid were present in the reaction mixture.
[2] No polycondensation catalyst added.

The intrinsic viscosities of the polyester resin products of the above examples were determined in a 60% phenol and 40% tetrachloroethane solution, wt./wt., at 30° C. The other analytical values set forth in the above table were obtained by conventional laboratory procedures.

The results shown in the above table indicate that the presence of the arsenic compounds of the present method during the direct esterification step facilitates the preparation of and improves the prepolymer formed and, in 5. The process of claim 1 wherein the arsenic compound is sodium arsenite.

6. The process of claim 1 wherein the arsenic compound is disodium arseno-acetate monohydrate.

7. The process of claim 1 wherein the direct esterification catalytic additive is diammonium arsenate.

8. The process of claim 1 wherein the direct esterification catalytic additive is disodium methyl arsenate.

9. The process of claim 1 wherein the direct esterification catalytic additive is calcium arsenite.

10. The process of claim 1 wherein the direct esterification catalytic additive is potassium hydrogen arsenite.

References Cited

UNITED STATES PATENTS 2,437,232  3/1948  Rothrock et al. _____ 260—75

FOREIGN PATENTS 1,297,516  5/1962  France.

WILLIAM H. SHORT, Primary Examiner

LOUISE P. QUAST, Assistant Examiner

U.S. Cl. X.R.

260—475

PO-1050
(5/69)

UNITED STATES PATENT OFFICE
CERTIFICATE OF CORRECTION

Patent No. 3,496,145     Dated February 17, 1970

Inventor(s) Mary E. Carter and John A. Price

It is certified that error appears in the above-identified patent and that said Letters Patent are hereby corrected as shown below:

Col. 2, line 7, after the word "comprising" insert the word --carrying--; line 33, "effort" should be --effect--. Col. 3, line 11, "polymer" should be --polyester--. In the Table, Example 3, under "First stage additive" "$(NH_3)$" should be -- $(NH_4)$ --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents